No. 849,081. PATENTED APR. 2, 1907.
C. ORTMANN.
CONTRIVANCE TO SPRINKLE MANURE.
APPLICATION FILED MAR. 30, 1906.

Witnesses:

Inventor:

UNITED STATES PATENT OFFICE.

CHRISTIAN ORTMANN, OF SCHEPENDORF, NEAR BAUMGARTEN, GERMANY.

CONTRIVANCE TO SPRINKLE MANURE.

No. 849,081.     Specification of Letters Patent.     Patented April 2, 1907.

Application filed March 30, 1906. Serial No. 309,000.

*To all whom it may concern:*

Be it known that I, CHRISTIAN ORTMANN, a subject of the German Emperor, and a resident of Schependorf, near Baumgarten, Germany, have invented certain new and useful Improvements in Contrivances to Sprinkle Manure, of which the following is a specification.

The purpose of the present invention is to afford the farmer a means for distributing or sprinkling manure evenly as required on the field.

The accompanying drawings represent a form of construction of this contrivance.

Figure 1:
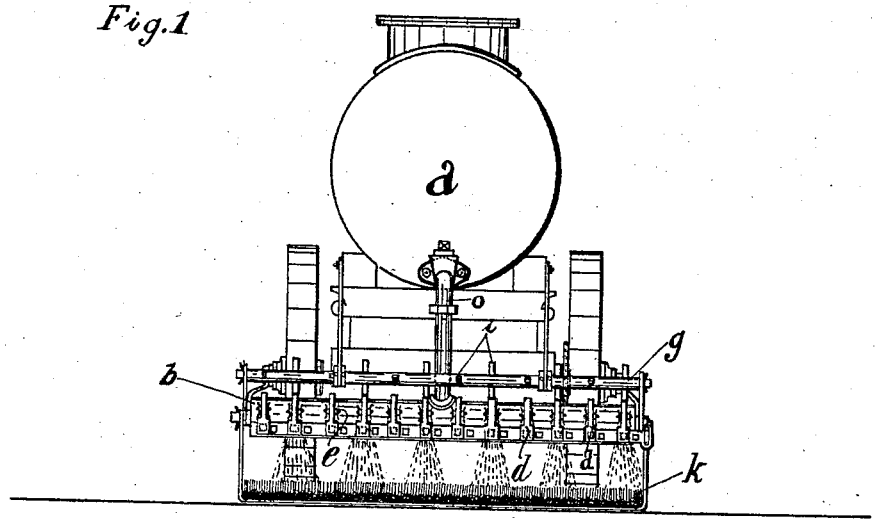
Figure 2:
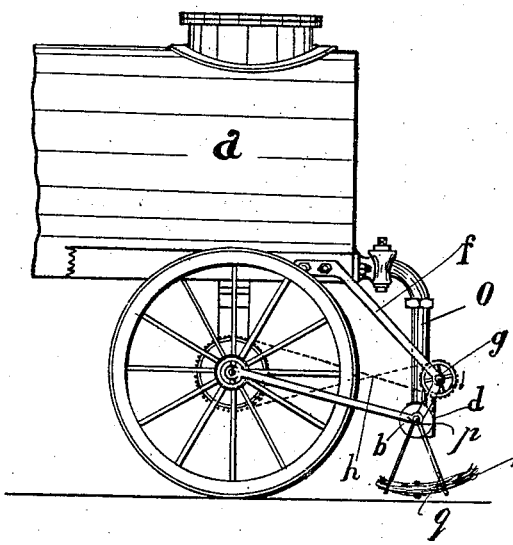
Figure 4:
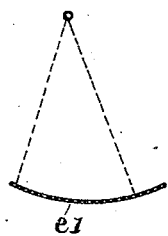
Figure 3:
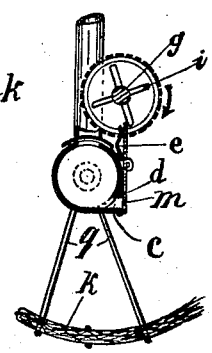

Figure 1 gives a back view of the same. Fig. 2 gives a side view; Fig. 3, a cross-section of the valve and pipe through which the manure is laid out, and the device shows the manner in which the flap-door is controlled. Fig. 4 shows a section of another style of receiver and dealer.

$a$, Fig. 1, is, as shown, a portable tank for containing the manure.

$b$, Fig. 1, is a pipe held in right angles by pipe $o$ and supported by $a$. The former is provided on its back facing with openings $m$ in Fig. 3, arranged at equal distances and bearing protruding tubes $c$. Each of these small protrusions is closed by a flap door or valve $d$, which opens outwardly, and these doors are provided with levers standing erect, as shown in Fig. 1. The doors or valves are kept pressed against the said openings by springs $e$ by engaging with the levers aforementioned. Above the pipe $b$ is an axle $g$, supported by arms $f$. This axle is set turning by reversed chain and toothed wheels $h$. The said axle $g$ is fitted with pins $i$ in such a manner that their ends touch the ends of the levers attached to the valves, thus causing an interrupted opening of the said valves when the axle is in motion, as shown in Fig. 3. The shallow receiver $k$ is supported by arms $p$ and forks $q$, as shown in Fig. 2.

The manner of working the above-described contrivance is as follows: When the sprinkler is set in motion after the liquid manure is admitted to the pipe $o$, the axle $g$, revolving by the action of the chain and wheels $h$, brings its protruding pins $i$ in contact with the ends of the levers attached to the valves $d$, causing the intermittent openings of the valves and letting a certain portion of manure flow into the shallow receiver $k$, whence the liquid is spread out on the soil.

The receiver above mentioned can be made of perforated material or preferably of brushwood in such a manner that all its twigs stand vertical.

I claim—

In a contrivance for sprinkling manure, the combination of tank $a$ bearing pipe $o$, a pipe $b$ connected to the same at right angles, tubes $c$ provided on openings in said pipe $b$, flap-valves $d$ hinged on said pipe $b$ and controlling the outlets of said tubes $c$, springs $e$ attached to the levers of said valves, arms $f$ fastened to the said tank $a$, axle $g$ supported by said arms $f$, toothed wheels and chain $h$ operatively connected with said axle $g$, pins $i$ affixed to said axle $g$ and arranged to operate said valves $d$, a perforated trough-shaped receiver $k$ supported by arms $p$ and forks $q$ adapted to receive the discharge from tubes $c$, substantially as described.

CHRISTIAN ORTMANN.

Witnesses:
   ERNST ORTMANN,
   WILHELM KLINK.